United States Patent

Rao et al.

[11] Patent Number: 5,910,465
[45] Date of Patent: Jun. 8, 1999

[54] PROCESS FOR THE PREPARATION OF A HIGHLY ACTIVE AND SELECTIVE AMMOXIDATION CATALYST AND ITS USE IN PREPARING HETEROAROMATIC NITRILES

[75] Inventors: Panja Kanta Rao; Kamaraju Seetha Rama Rao; Vattikonda Venkata Rao; Kalavaru Venkata Narayana; Akula Venugopal; Alla Venkata Rama Rao; Machiraju Subrahmanyam, all of Hyderabad, India

[73] Assignee: Council of Scientific & Industrial Research, New Delhi, India

[21] Appl. No.: 08/615,855

[22] Filed: Mar. 12, 1996

[51] Int. Cl.⁶ .......................... B01J 27/198; B01J 27/192; B01J 27/182

[52] U.S. Cl. .......................... 502/209; 502/212; 502/214; 546/286

[58] Field of Search .................................... 502/209, 212, 502/214

[56] References Cited

U.S. PATENT DOCUMENTS

| | | | |
|---|---|---|---|
| 4,778,890 | 10/1988 | Shimizu et al. | 544/336 |
| 4,939,260 | 7/1990 | Inoue et al. | 546/286 |
| 4,963,687 | 10/1990 | Saito et al. | 546/286 |

*Primary Examiner*—Alan L. Rotman
*Attorney, Agent, or Firm*—Darby & Darby

[57] ABSTRACT

This invention relates to a process for the preparation of highly active and selective ammoxidation catalyst of formula $(VO)_2P_2O_7, TiO_2$ or $(VO)_2P_2O_7, Al_2O_3$, which process comprises refluxing a vanadium source in the presence of alcohols; adding a source of phosphorous to form vanadyl pyrophosphate hydrate $(VO)_2H_4P_2O_9$ or $(VO)_2P_2O_7 \cdot 2H_2O$; Physical mixing of $(VO)_2H_4P_2O_9$ with oxides selected from titania or alumina, and heating the resultant mixture in the presence of air at a temperature in the range of 300–600°C. for a period in the range of 1 to 10 hours; and the use of said ammoxidation catalyst in the preparation of heteroaromatic nitrites.

9 Claims, No Drawings

PROCESS FOR THE PREPARATION OF A HIGHLY ACTIVE AND SELECTIVE AMMOXIDATION CATALYST AND ITS USE IN PREPARING HETEROAROMATIC NITRILES

FIELD OF THE INVENTION

The present invention relates to a process for the preparation of a highly active and selective ammoxidation catalyst and its use in preparing heteroaromatic nitriles. The catalyst prepared by the process of the present invention is useful for the production of heteroaromatic nitriles in high yields.

BACKGROUND OF THE INVENTION

The heteroaromatic nitrites are valuable intermediates for the preparation of corresponding amides which are used in pharmaceuticals. For example, 3-cyanopyridine is used in the preparation of the niacin or nicotinamide useful for the prevention of pellagra and 4-cyanopyridine is used in the preparation of isoniazid, an anti tuberculosis drug. The heteroaromatic nitrites are hitherto being prepared by a vapour phase reaction of a gas mixture consisting of alkyl substituted heteroaromatic compound, ammonia and oxygen (namely ammoxidation) over a mixed oxide catalyst.

PRIOR ART REFERENCES

Hitherto, for the catalytic ammoxidation of alkyl substituted heteroaromatic compound to get corresponding nitriles, a number of processes were reported. One of such processes, in the U.S. Pat. Publication No. 2,510,605 discloses a catalyst comprising of vanadium, molybdenum and phosphorous with alumina as a carrier for the ammoxidation of $\alpha$-, $\beta$-, $\tau$-, picolines. Although this process reported a reasonably good yield (60%) at 450° C., this high temperature of reaction is undesirable in industrial point of view. Another U.S. Pat. Publication No. 2,839,535 discloses a variety of $V_2O_5$ catalyst supported on $Al_2O_3$ heated at different temperatures and the process described in this patent resulted a 80% and 74% yields of isonicotinonitrile and nicotinonitrile respectively. Another U.S. Pat. Publication No. 2,861,999 discloses more or less same yield of isonicotinionitrile and nicontinionitrile in the presence of a large excess of air over a catalyst comprising oxides of vanadium, molybdenum, and phosphorous supported on activated alumina. Yet another U.S. Pat. Publication No. 3,981,879 discloses a ($V_2O_5$ +$MoO_3$ +$P_2O_5$ +$SnO_2$)/pumice catalyst composition to prepare 3-cyanopyridine with 90% selectivity at 76% conversion. A Japanese Patent Publication No. 19706 discloses a catalyst comprising antimony oxide, vanadium oxide and a metal selected from the group consisting of iron, copper, titanium, cobalt, manganese and nickel, for the ammoxidation of the alkyl substituted heteroaromatic compound. Although this catalyst has high selectivity, it suffers from deactivation through reduction with ammonia and hence lacks consideration for continuous industrial production. An Indian Patent publication No. 138052 discloses a process relating to the production of 3-cyanopyridine with 83 % yield over a vanadium pentoxide—molybdenum trioxide—phosphorous pentoxide catalyst.

Nevertheless, the catalyst mentioned above involve many problems left unsolved for industrial production point of view such as necessity of using large excess of ammonia or air, catalyst deactivation, low yields of nitriles, high reaction temperature.

OBJECTS OF THE INVENTION

The main object of the present invention is to provide a process for inventing a versatile ammoxidation catalyst by physical mixing of an active phase (vanadium-phosphorousoxide) with other oxides, titanium oxide, aluminium oxide either with or without promoter in a solid state, a technique called solid-solid wetting.

The other object of the present invention is to provide a process for preparing a highly active (conversion 90–100%) and selective (90–99%) catalyst comprising vanadium oxide-phosphorous oxide and titanium oxide for producing heteroaromatic nitriles.

Another object of the present invention is to provide a process for preparing heteroaromatic nitriles such as nicotinonitrile, isonicotinonitrile, 3-cyanopyridine and 4-cyanopyridine in greater yields (90–99%).

Yet another object of the invention is to provide a process for preparing a versatile ammoxidation catalyst by physical mixing of an active phase (vanadium-phosphorous-oxide) with other oxides such as titanium oxide or aluminium oxide either with or without promoter such as bismuth oxide or bismuth nitrate, in solid state, a technique called solid-solid wetting.

SUMMARY OF THE INVENTION

The above objects are achieved by providing a process for the preparation of highly active and selective ammoxidation catalyst of formula $(VO)_2P_2O_7$, $TiO_2$ or $(VO)_2P_2O_7$, $Al_2O_3$, which comprises, i. refluxing a vanadium source in the presence of alcohols as described in the following text;

ii. adding a source of phosphorous to form vanadyl pyrophosphate hydrate $(VO)_2H_4P_2O_9$ or $(VO)_2P_2O_7.2H_2O$;

iii. Physical mixing of $(VO)_2H_4P_2O_9$ with oxides like titania, alumina and iv. heating the resultant mixture at a temperature in the range of 300° C. to 600° C. for a period in the range of 1 to 10 hours.

DETAILED DESCRIPTION OF THE INVENTION

The process for the preparation of a catalyst according to the present invention involves the preparation of vanadyl pyrophosphate hydrate and the addition of $TiO_2$ support. The preparation of the vanadyl pyrophosphate hydrate involves refluxing of vanadium rich compounds, preferably vanadium salts, ammonium meta vanadate, vanadyl sulphate, oxides of vanadium like vanadium pentoxide in a mixture of aliphatic and aromatic alcohols like ethanol, propanol, butanol, benzyl alcohol followed by addition of phosphorous containing molecules like ortho phosphoric acid. The phosphorous to vanadium ratio is kept not greater than 10, particularly not more than 5, more particularly not more than 2.

According to another feature of the present invention, there is provided a process wherein the vanadyl pyrophosphate hydrate is thoroughly mixed with titanium dioxide in the range of ratio of 1:1 to 1:15, preferably in the range of 1:5 to 1:15 and heating the resultant mixture in air for a period in the range of 1 to 10 hours, preferably not more than 8 hours, more preferably not more than 5 hours.

The present invention also describes a process wherein the titanium used is either anatase or rutile forms or a mixture of both with a surface area preferably of not more than $120\ m^2g^{-1}$, particularly not more than $100\ m^2g^{-1}$ more particularly not more than $60\ m^2g^{-1}$.

In the present invention, the source of phosphorous is selected from ortho phosphoric acid, pyro phosphoric acid, meta phosphoric acid and the like, and said oxide of titania is titanium dioxide. Further, the ratio of the salts of vanadium, phosphorous and titanium is in the range of 1:3:50 to 1:8:200.

The invention also provides a process for the production of 3 & 4 cyanopyridines in high yields by vapour phase ammoxidation of respective methyl pyridines in presence of air and ammonia over V—P—Ti—O catalyst at moderate temperature in the range of 320° C. to 450° C.

Preferably, the yields of 3 & 4 cyanopyridines are greater than 92% and 97% respectively, the molar concentrations of 3 & 4 methyl pyridines respectively are in the range of 0.5 to 3.0%, the O/NH$_3$ is in the range of 1 to 5.

In addition, the space velocities are in the range of 1 500 to 4000 hour$^{-1}$ and the dilution of catalyst with an inert medium is in the range of 0.5 to 5 (by volume) with respect to the volume of catalyst.

The present invention is illustrated in greater detail with reference to the following examples but it is understood that the present invention is not deemed to be limited thereto.

EXAMPLE 1

About 1 mole of V$_2$O$_5$ is added to a solution of 2-butanol (12 moles) and benzyl alcohol (7 moles) taken in a 2 liter three necked round bottom flask. The suspension was refluxed with constant stirring for a period of 4 hours. The mixture was cooled to ambient temperature and stirring was continued at this temperature for a period of 12 hours. 2.5 moles of o-phosphoric acid was added and the resultant mixture was heated under reflux for 2 hours. After cooling to room temperature, the slurry was filtered and washed with ethanol several times. The resulting material was dried in air at 150° C. for 10 hours to give a crystalline oxide represented by the formula $(VO)_{n\ Pn}\ O_{2n-1X}\ H_2O$ wherein n is an integer not less than 2 and X is 0 or a positive integer. About 20 gms of the dried precursor material is mixed with 100 gms of TiO2 thoroughly and pelletized. The pellets were calcined in air at 500° C. for 2 hours. The calcined material was crushed and sieved to 2 mm size particles. The catalyst is labelled as V—P—Ti—O catalyst.

EXAMPLE 2

1 mole of V$_2$O$_5$ powder is refluxed in a mixture of 2-butanol (12 moles) and benzyl alcohol (7 moles) for a period of 4 hours. The suspension is cooled to room temperature and stirring is continued for another 12 hours. 2.5 moles of o-phosphoric acid and 0.04 moles of bismuth nitrate are added to the suspension and again refluxed for 2 hours. After cooling to room temperature, the suspension was filtered, washed and dried at 150° C. for overnight. 20 grms of this dried material was ground with 100 grms of TiO$_2$ powder. The grounded powder was calcined at 500° C. for 2 hours. The calcined sample was pelletized, crushed and sieved to 2 mm particle size. The catalyst sample is labelled as VP—Bi—Ti—O catalyst.

EXAMPLE 3

A mixture of 1 mole of V$_2$O$_5$ 12 moles of 2-butanol and 7 moles of benzyl alcohol is refluxed for a period of 4 hours. The suspension is cooled to ambient temperature and stirring is continued for another 12 hours. At this stage, 2.5 moles of o-phosphoric acid is added and refluxed for 2 hours. After cooling to room temperature, the suspension was filtered, washed and dried at 150° C. for overnight. 20 grms of this dried material was thoroughly mixed with 100 grms of α-Al$_2$O$_3$ powder. The finely mixed powder was calcined at 500° C. for 2 hours. The calcined sample was plelletized, crushed and sieved to 2 mm particle size. The catalyst sample is labelled as V—P—AL—O catalyst.

EXAMPLE 4

A pyrex glass reactor of 20 mm i.d. and 750 mm long is filled with V—P—Ti—O catalyst particles described as in example 1 mixed with diluent in a total bed length of 300 mm. Above the catalyst bed, a preheater zone consisting of pyrex glass beads in about 300 mm length are placed. The catalyst is reduced in hydrogen flow at 450° C. for a period of 5 hours. The reactor is cooled, ammonia and air (O/NH$_3$—4.0 ) are admitted and the reactor is heated slowly to a temperature of 320° C. where 3-methyl pyridine mixed with water in a molar ratio of 1:13 is fed continuously into the reactor with a 3-methyl pyridine molar concentration of 1.5%. The reaction is carried out at a temperature of around 370° C. and at a space velocity of 2000 hour$^{-1}$. The product mixture is analysed for every 5 hour interval by a gas chromatograph and the product is isolated after the reaction is run continuously for a period of 24 hours. The isolated yield of 3-cyanopyridine based on 3-pyridine charged is found to be 92% at a 3-methyl pyridine conversion of 99%.

EXAMPLE 5

The reaction is carried out by the process described as in Example 4 using 4-methyl pyridine over V—P—Ti—O catalyst with the following conditions:

| | |
|---|---|
| Space velocity | 2500 hour$^{-1}$ |
| O/NH$_3$ | 3.0 |
| Molar concentration of 4-methyl pyridine | 1.6% |
| Reaction temperature | 360° C. |

The reaction is carried out continuously for a period of 24 hours and the product is isolated. The isolated yield of 4-cyanopyridine based on 4-methyl pyridine charged is found to be 96% at 100% conversion of 4-methyl pyridine.

EXAMPLE 6

V—P—Bi—Ti—O catalyst described as in Example 2 is loaded along with diluents in a pyrex glass reactor. The catalyst is reduced in hydrogen flow at 450° C. for a period of 3 hours. After cooling the reactor, a mixture of ammonia and air (O/NH$_3$=4.0) in introduced and the reactor is heated slowly upto reactor temperature of 385° C. Aqueous solution of 3-methyl pyridine (H$_2$O/3-methyl pyridine =13) is continously fed into the reactor at a space velocity of 2000 h $_{-1}$. The product mixture is analysed at regular intervals by a gas chromatograph. The yield of 3-cyanopyridine based on 3-methyl pyridine charged is found to be 90% at a 3-methyl pyridine conversion of 97%.

EXAMPLE 7

V—P—Al—O catalyst described as in Example 3 is packed along with diluents in a pyrex glass reactor and the catalyst is reduced in the stream of hydrogen at 450° C. for 4 hours. The reactor is cooled and a mixture of ammonia and air (O/NH$_3$ =2.0) is allowed into the reactor. The reactor is slowly heated to a reaction temperature of 390° C. At this temperature an aqueous mixture of 3-O methyl pyridine (H$_2$O/3-methyl pyridine =13.5) is fed continuously at a space velocity of 1750 h $_{-1}$. The product mixture is analysed at regular intervals by a gas chromatograph. The yield of 3-cyanopyridine based on 3-methyl pyridine charged is found to be 91% at 3-methyl pyridine conversion of 94.3%.

We claim:

1. A process for the preparation of highly active and selective ammoxidation catalyst of formula $(VO)_2P_2O_7$, $TiO_2$ or $(VO)_2P_2O_7$, $Al_2O_3$, which process comprises:
    i. refluxing a vanadium salt or a vanadium oxide in the presence of an aliphatic or aromatic alcohol or a mixture thereof;
    ii. adding a acid to form vanadyl pyrophosphate hydrate $(VO)_2H_4P_2O_9$ or $(VO)_2P_2O_7.2H_2O$;
    iii. mixing $(VO)_2H_4P_2O_9$ with oxides selected from titanium or aluminum, and
    iv. heating the resultant mixture in the presence of air at a tempera-ture of 300–600 ° C. for a period of 1 to 10 hours.

2. process as claimed in claim 1 wherein said catalyst also comprises a such bismuth oxide or bismuth nitrate promoter.

3. A process as claimed in claim 1 wherein said vanadium salt is ammonium meta vanadate, or vanadyl sulphate, and said vanadium oxide is vanadium pentoxide.

4. A process as claimed in claim 1 wherein the aliphatic alcohol is ethanol, propanol, or butanol, and the aromatic alcohol is benzyl alcohol.

5. A process as claimed in claim 1 wherein said phosphoric acid is selected from ortho phosphoric acid, pyro phosphoric acid, or meta phosphoric acid, and said oxide of titanium is titanium dioxide.

6. A process as claimed in claim 1 wherein the ratio of the compounds of vanadium, phosphorous and titanium is in the range of 1:3:50 to 1:8:200.

7. A process as claimed 1 wherein the vanadyl pyrophosophate is mixed with titanium oxide in the ratio of 1:1 to 1:15 .

8. A process as claimed in claim 1 wherein the oxide of titanium is selected from anatase or rutile or a mixture thereof.

9. A process as claimed in claim 8 wherein the surface area of anatase or rutile is not more than 120 $m^2g^{-1}$ .

* * * * *